Aug. 13, 1935.  F. W. SCHWINN  2,011,016
RECEPTACLE FOR BICYCLES
Filed April 14, 1934   2 Sheets-Sheet 2
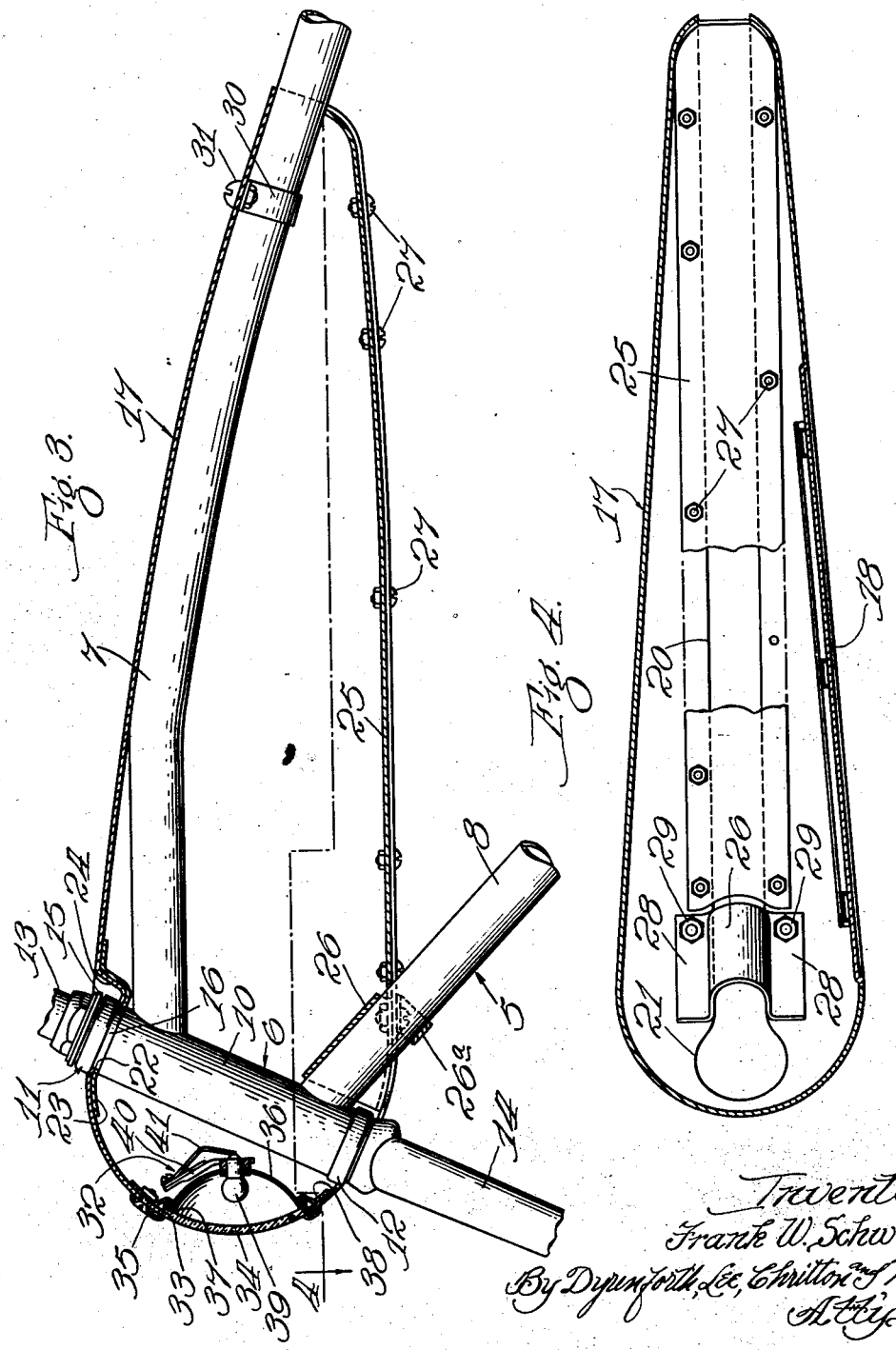

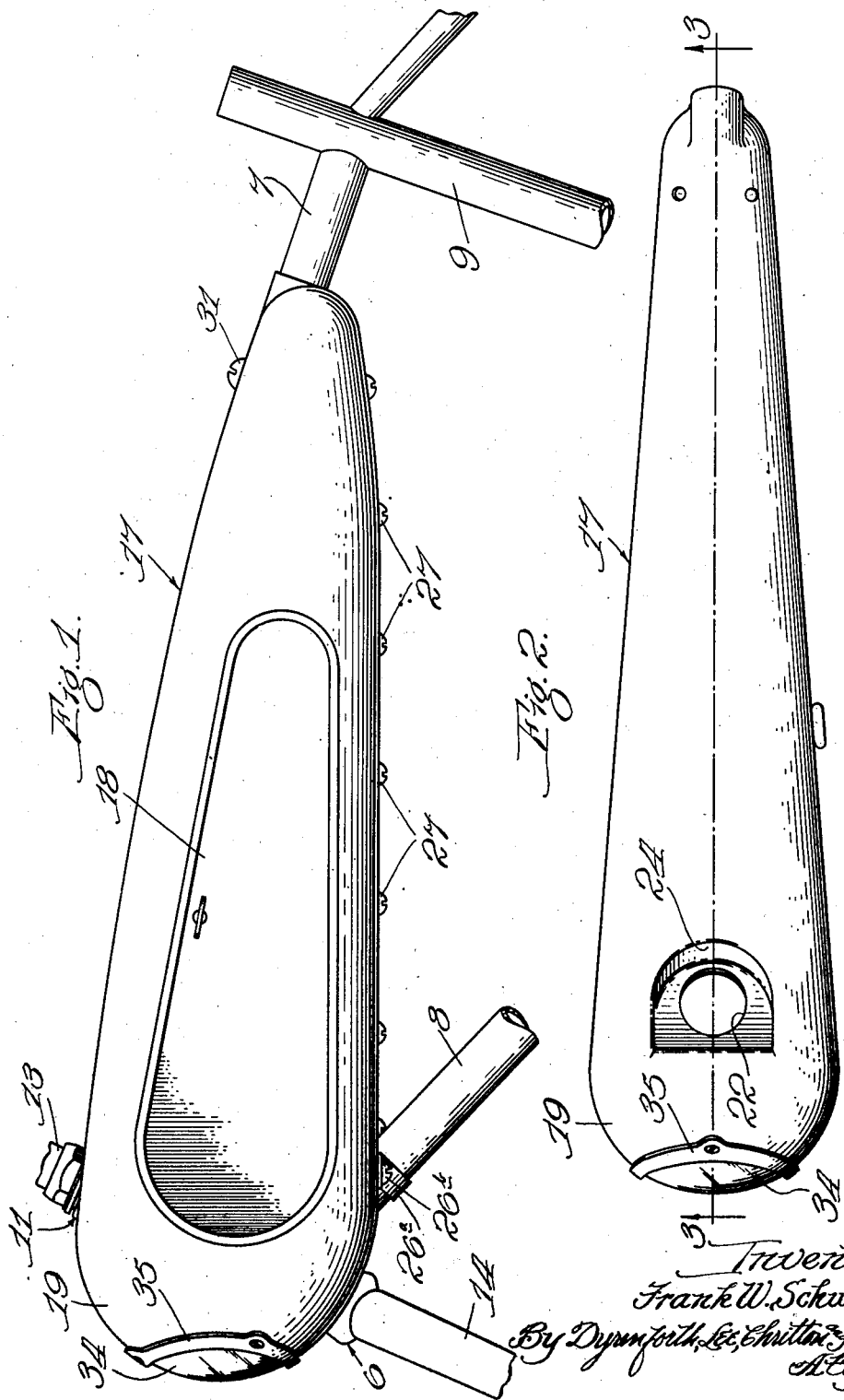

Patented Aug. 13, 1935

2,011,016

UNITED STATES PATENT OFFICE 2,011,016

RECEPTACLE FOR BICYCLES

Frank W. Schwinn, Chicago, Ill.

Application April 14, 1934, Serial No. 720,647

10 Claims. (Cl. 224—35)

My invention relates to receptacles, as for batteries, tools, or other objects, provided on bicycle frames usually along the upper cross bars thereof.

Certain of my objects are to provide for the mounting of the receptacle in a position to cover the upper cross bar of the frame; to provide for the surrounding of the steering head of the frame by the forward end of the receptacle; to provide for the rigid securing of the receptacle in place on the frame and by simple and economical means; to provide an economical construction of receptacle and one which will present the desired attractive appearance; to provide a light projecting device, such as a spot-light, at the front end of the receptacle and preferably housed therein; and other objects as will be manifest from the following description.

Referring to the accompanying drawings:

Figure 1 is a view in side elevation of the upper portion of a bicycle frame showing it as equipped with a receptacle in accordance with my invention.

Figure 2 is a plan view of the receptacle.

Figure 3 is a section taken at the line 3—3 on Fig. 2 and viewed in the direction of the arrow showing the receptacle in place on the bicycle frame; and Figure 4, a section taken at the irregular line 4 on Fig. 3 and viewed in the direction of the arrow, this view also showing the receptacle as applied to the frame.

In the construction shown the upper portion of a bicycle frame of common construction is represented at 5, the steering head being shown at 6, the upper top bar at 7, the lower reach bar at 8 and the seat post tube at 9, the head 6 in accordance with common practice being formed of a tube 10 provided with upper and lower race-way-forming cups 11 and 12, respectively, of ball bearings at which the steering post 13, carrying the front fork 14, is journalled in the tube 10, the upper race-way-forming cup 11, in accordance with common practice being enlarged at its upper end as represented at 15 and telescoped at its lower tubular portion 16 of reduced diameter, with the upper end of the tube 10.

17 represents a receptacle constituting an embodiment of my invention and adapted for assembly with the bicycle frame preferably in the position as shown.

The receptacle 17, preferably made of sheet metal and having an opening in its side closed by a door 18, is shown of streamline form presenting the rounded, blunt, front end portion 19 from which the receptacle tapers to its rear end as shown.

The receptacle 17 which, in the particular form shown, is adapted to be applied to position on the frame from the top thereof, is provided along its underside with a slot 20 the forward end of which reaches short of the front extremity of the receptacle and is somewhat enlarged and of circular form as shown at 21, the receptacle on its upper side having a circular aperture 22 at which portion this wall is reinforced by an apertured plate 23.

The slot 20 and the enlarged portion 21 thereof are slightly wider than the diameter of the bars 7 and 8 and the cups 11 and 12, respectively, and the aperture 22 of slightly less diameter than the portion 16 of the cup 11, whereby the receptacle may be slipped over the frame (the cup 11 and the securing parts therefor being removed) to the position shown in which the front of the receptacle extends forwardly beyond the head 6, which latter is thus surrounded by the receptacle, the receptacle rests at its top wall on the top bar 7, and the wall of the aperture 22 rests on the upper end of the tube 10.

Upon applying the cup 11 to operative position as shown in Fig. 3, the receptacle, at the wall of the opening 22 which is deformed as shown at 24 to cause this wall to extend parallel with the top of the tube 10, is clamped between the tube 10 and the cup 11 thereby forming a rigid connection between receptacle 17 and the bicycle frame.

The slot 20, by preference, is closed by closure means shown as provided in two sections 25 and 26, the section 25 being shown as reaching substantially from the bar 8 to the underside of the rear portion of the bar 7 and held in place by bolts 27, and the section 26 being shown as in the form of a stirrup straddling the bar 8 and having ears 28 at which it is secured, as by bolts 29, to the body of the receptacle. The section 26 thus forms an additional means for rigidly holding the receptacle in place, these means being further augmented in the particular construction shown by a yoke clip 30 straddling the bar 7 at its rear end and held to the top of the recepacle as by bolts 31, and by a stirrup clip 26ª straddling the tube 8 at the side thereof opposite that at which the stirrup section 26 extends, and held at its opposite ends to the body of the receptacle as by bolts, one of which is represented at 26ᵇ.

The receptacle is shown as also comprising a light-projecting device 32 shown as an electric spot-light located adjacent an opening 33 in the front end of the receptacle 17. The opening 33 is shown as provided with a concavo convex light-transmitting member 34, as for example of glass, and forming the lens of the spot-light, held in place by a bezel 35 secured to the receptacle, the reflector of the spot-light and represented at 36 being located in the interior of the receptacle and held in place against a gasket 37 by a flanged ring 38 secured to the receptacle. The electric bulb of the spot-light and shown at 39 is associated with the reflector and connected with electrical contact devices 40 and 41, in the usual manner, the current being supplied to the lamp by any suitable means, as for example by batteries (not shown) which may be carried in the receptacle 17 as well as tools, or other objects as desired.

While I have illustrated and described a certain particular embodiment of my invention, I do not wish to be understood as intending to limit it thereto, as the same may be variously modified and altered without departing from the spirit of my invention.

What I claim as new, and desire to secure by Letters Patent, is:

1. The combination with a bicycle frame comprising a top bar, a steering head and a lower reach bar, of a receptacle having a slot in its underside at which it straddles said lower bar, and closure means for said slot comprising a plate having a portion seated on said lower bar.

2. The combination with a bicycle frame comprising a top bar, a steering head and a lower reach bar, of a receptacle having a slot in its underside at which it straddles said lower bar, and closure means for said slot comprising a plate having a stirrup portion seated on said lower bar.

3. The combination with a bicycle frame comprising a steering head including a steering-head tube and bearing cups therefor, of a receptacle containing an opening through which said head extends, said receptacle bearing against an end of said tube and clamped to the latter by one of said cups.

4. A receptacle-structure for a bicycle having a slot in its underside adapting the receptacle to be applied to straddling position on the frame of a bicycle enclosing a part of the top bar, said top bar being in supporting engagement with the inside surface of the receptacle-structure opposite to the slot.

5. A receptacle-structure for a bicycle having a slot in its underside reaching short of the front wall of the receptacle and adapting the receptacle to be applied to straddling position relative to the top bar of the frame of a bicycle and in surrounding relationship to the steering head of said frame.

6. A receptacle-structure for a bicycle having a slot in its underside enclosing a part of the top bar, said top bar being in supporting engagement with the inside surface of the receptacle-structure opposite to the slot and closure means for said slot having a portion adapted to seat on the lower reach bar of the bicycle frame to which it is applied.

7. A receptacle-structure for a bicycle having a slot in its underside and closure means for said slot having a stirrup portion adapted to seat on the lower reach bar of a bicycle frame to which it is applied.

8. A receptacle-structure for a bicycle having a steering head and a top bar, said receptacle surrounding a portion of said top bar and being apertured adjacent its forward end to adapt it to surround the steering head and project forward beyond said head, and a light-projecting device in the forward end portion of said receptacle-structure in advance of the space which accommodates said head, so that the device will be protected by the head against the impact of loose articles within the receptacle-structure.

9. A receptacle-structure for a bicycle having a steering head and a top bar, said receptacle surrounding a portion of said top bar and apertured adjacent its forward end to adapt it to surround the steering head and project forward beyond said head, the front wall of said receptacle-structure having an aperture, a light-transmitting member at said aperture and a light-projecting device in the front end portion of said receptacle-structure and positioned at the rear of said member in advance of the space which accommodates said head, so that the device will be protected by the head against the impact of loose articles within the receptacle-structure.

10. The combination with a bicycle frame comprising a steering head, of a receptacle on said frame having an opening through which a part of said head extends, said head including a shoulder against which a portion of the wall of the receptacle about said opening abuts, and a frame member on said steering head adjacent said shoulder engaging said portion on the opposite side to said shoulder and clamping said receptacle to the shoulder.

FRANK W. SCHWINN.